Nov. 29, 1932.    E. T. WAHLBOM ET AL    1,889,231
WATER SOFTENER
Original Filed June 14, 1929    3 Sheets-Sheet 3
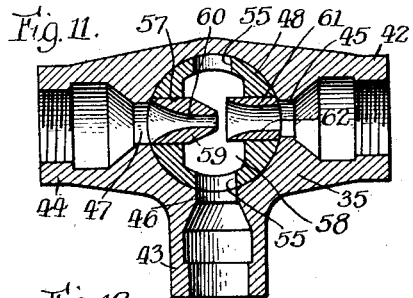
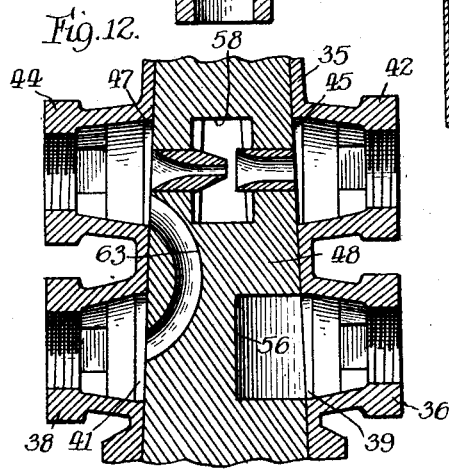
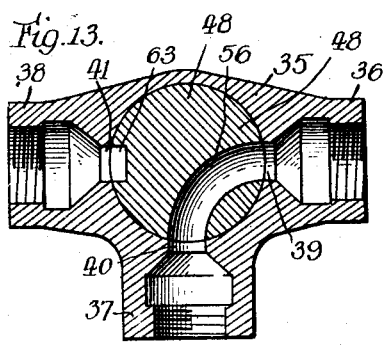
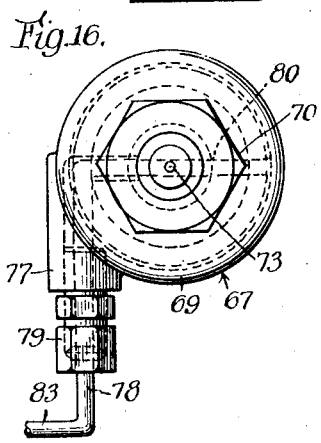
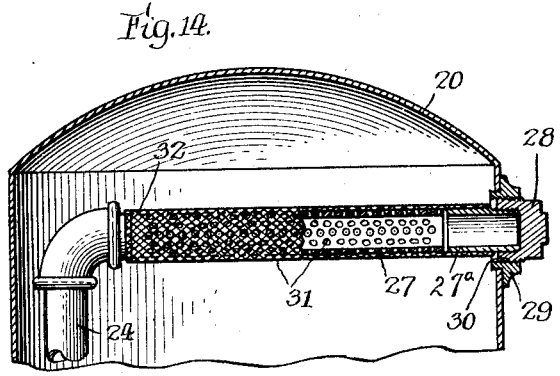
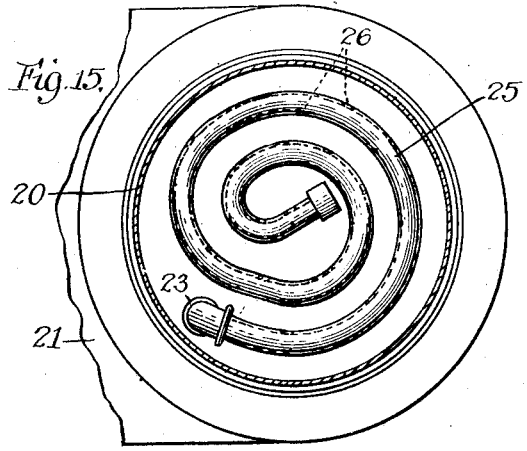
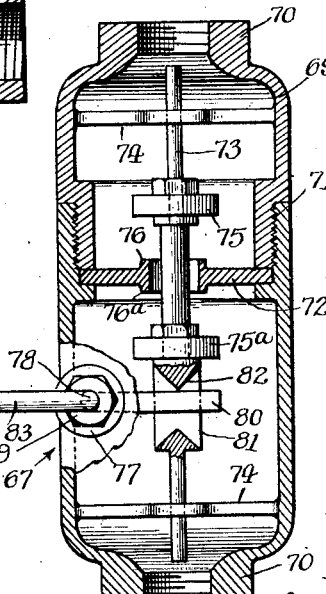
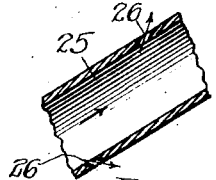
Inventors:
Ernest T. Wahlbom,
Leroy C. Lind,
Philip C. Wahlbom
By Churchill, Parker Calvin
Attys.

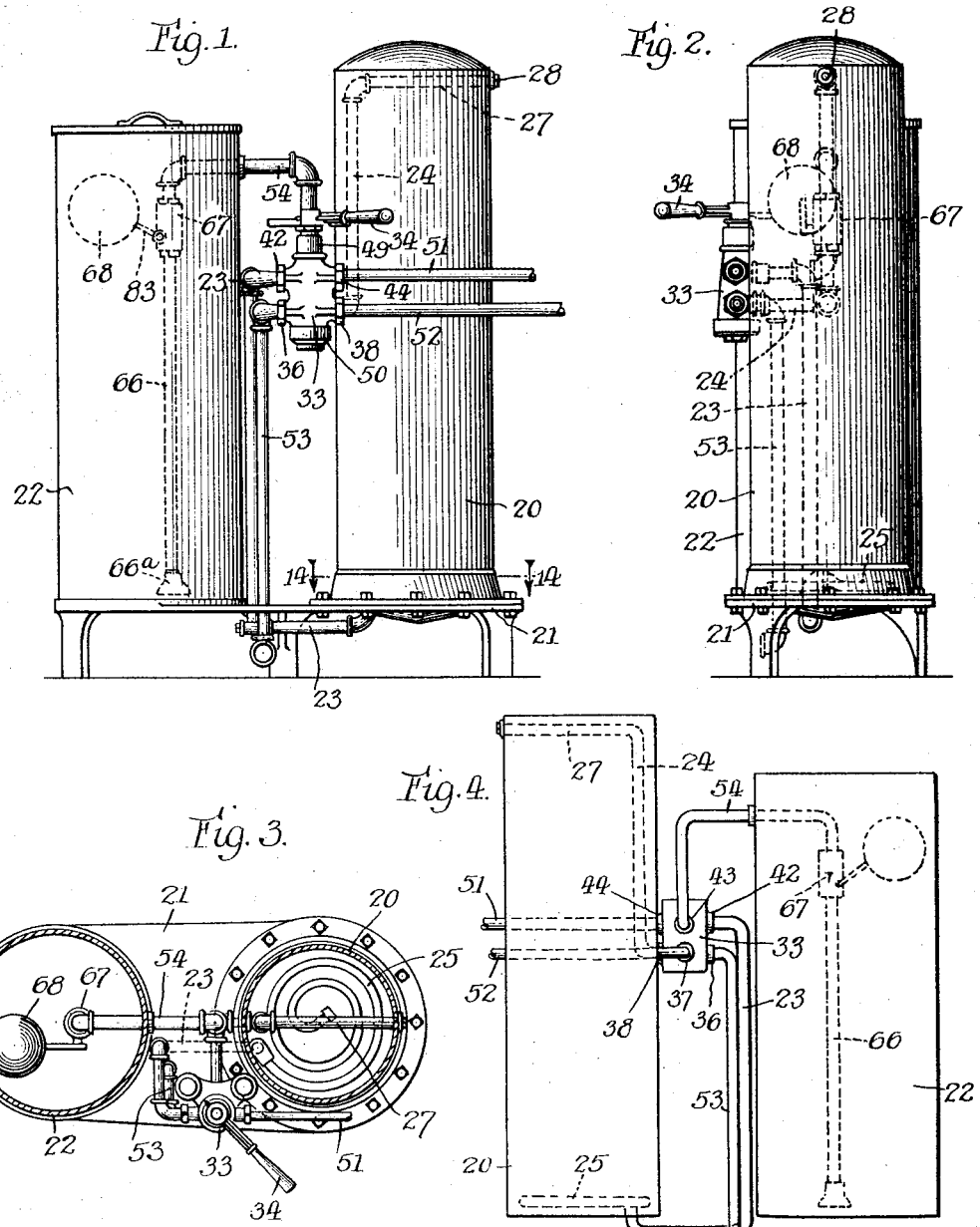

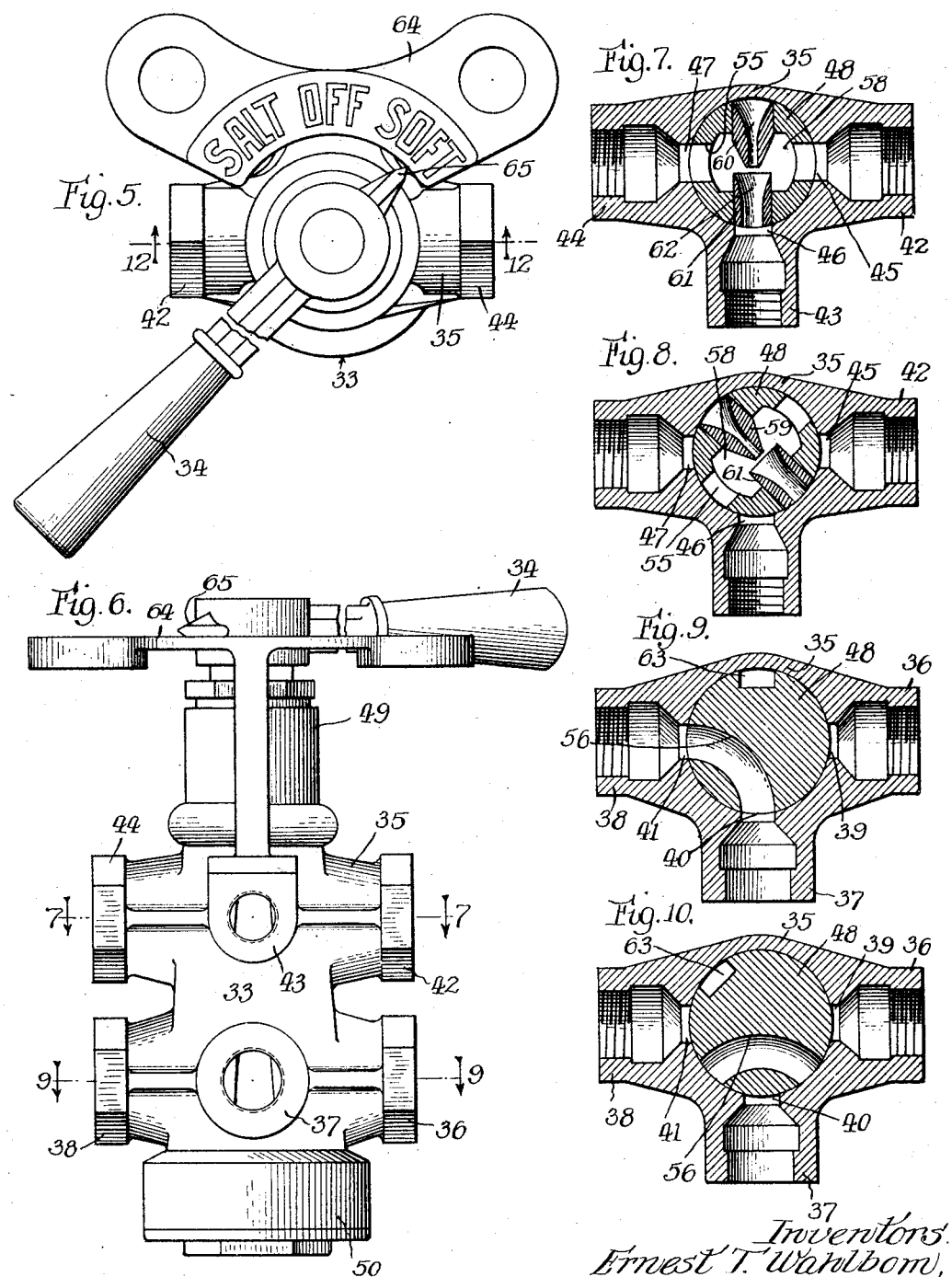

Patented Nov. 29, 1932

1,889,231

UNITED STATES PATENT OFFICE

ERNEST T. WAHLBOM, LEROY C. LIND, AND PHILIP C. WAHLBOM, OF ROCKFORD, ILLINOIS

WATER SOFTENER

Application filed June 14, 1929, Serial No. 370,758. Renewed February 23, 1932.

The invention relates generally to water softeners, with more particular reference to softeners of the type employing a zeolitic material or mineral in the softening process, and has as its aim the production of a water softener which requires no skill or technical experience on the part of the operator.

An object of the invention is to provide a new and improved softener of this character which is substantially automatic in operation.

Another object of the invention is to provide a water softening system in which the change from the softening to the regenerating cycle and vice-versa may be entirely controlled and effected by a single control member.

In connection with the foregoing, a further object resides in the provision of a valve unit arranged to control and direct the flow of water and brine during the softening or regenerating cycles, which valve embodies a single operating means.

Another object of the invention is to provide a means by which the flow of water to the distributing system supplied by the water softener may continue uninterruptedly during the regenerating cycle of the water softener.

Still another object of the invention resides in the provision of a new and improved means for accurately determining the amount and strength of the brine solution delivered to the zeolitic material during the regenerating cycle.

A further object is to provide a means for delivering water to the zeolitic mineral whereby an even distribution of the flow through the material is obtained.

Other objects and advantages will become apparent from the following description and from the accompanying drawings, in which:

Figure 1 is a front elevation of a water softening system embodying the present invention.

Fig. 2 is a side elevation looking from the right hand side of Fig. 1.

Fig. 3 is a plan view of the same.

Fig. 4 is a diagrammatic view of the apparatus illustrating in particular the pipe connections as they appear from the rear side thereof.

Figs. 5 and 6 are a plan view and a rear elevation of the valve respectively.

Fig. 7 is a transverse section of the valve taken substantially along the lines 7—7 of Fig. 6 showing the valve in one operative position thereof.

Fig. 8 is a similar view showing the valve in the "cut-off" position.

Fig. 9 is a transverse section taken substantially along the lines 9—9 of Fig. 6 showing the valve in the position corresponding to the position illustrated in Fig. 7.

Fig. 10 is a similar view showing the valve set for a position corresponding to that shown in Fig. 8.

Fig. 11 is a transverse section of the valve similar to the section shown in Figs. 7 and 8, and illustrating the position of the valve during another operative cycle.

Fig. 12 is a fragmentary vertical central section through the valve taken substantially along the lines 12—12 of Fig. 5.

Fig. 13 is a transverse section of the valve similar to the sections shown in Figs. 9 and 10 illustrating the position of the valve during the operative cycle shown in Fig. 11.

Fig. 14 is a fragmentary detail of the upper portion of the zeolitic tank showing the strainer in partial section.

Fig. 15 is a plan view of the water distributor.

Figs. 16 and 17 are enlarged plan and elevational details of the valve for controlling the liquid flow to and from the brine tank.

Fig. 18 is an enlarged central section of a portion of the distributor illustrated in Fig. 15.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

The general operation of water softeners using a zeolitic mineral is generally understood by those skilled in the art and it is deemed unnecessary, therefore, to consider such operation in detail. Sufficient to say that the operation is divided into two cycles, i. e., a water softening cycle, and a regenerating cycle. In the water softening cycle, the raw water traverses a bed of zeolitic mineral in such a manner that the water comes into intimate contact therewith, and the hard constituents in the water removed. Inasmuch as the zeolitic mineral will only remove a certain amount of the water hardening constituents, it becomes necessary from time to time to regenerate the zeolite. This action comprises the regeneration cycle and is effected by passing a brine solution through the zeolitic bed.

Referring particularly to Figs. 1, 2, and 3, of the drawings, 20 indicates generally an upright tank which contains a bed of zeolitic mineral. The tank 20 is supported upon a suitable base 21 which preferably is of sufficient size to accommodate a second or brine tank 22. The zeolite containing tank or, as it will hereinafter be termed, the softening tank is of the upflow type; that is, the hard raw water enters the bottom of the tank through a pipe or conduit 23, flows upwardly of the tank through the bed of zeolite and is withdrawn from the top of the tank through a pipe 24.

It has been found in softeners of the upflow type that if the flow of incoming water is restricted to a small area at the base of the mineral bed, or even if it is distributed from several spaced points at the bottom of the bed, there is a tendency of the upflowing water to follow the lines of least resistance and in time to cut channels through the bed of the mineral. Obviously, this is disadvantageous inasmuch as the water cannot come into intimate contact with the entire bed of the material. Thus, the efficiency of the softening cycle is materially diminished, and regeneration of the zeolite becomes more frequently necessary.

To overcome these disadvantages, a distributing means is provided in the bottom of the distributing tank by which the flow of water is directed evenly against the base of the zeolite bed with even and uniform pressure throughout the entire area. Referring to Figs. 2, 15, and 18, this means is shown in the form of a spirally coiled distributor pipe 25 disposed transversely in the base of the softening tank 20. The distributor pipe 25 is preferably formed of hard rubber, or the like, and is closed at one end, the other end being arranged for connection to the inlet end of the pipe 23.

At spaced intervals along the lateral sides of the distributor pipe, a plurality of apertures 26 are provided which preferably extend angularly through the coil, as shown in Fig. 18, to open towards the flow of water through the coil. Thus, water will be injected into the tank 20 from the distributor coil at numerous points and, being discharged angularly, has a circular rotating motion in the bottom of the softening tank, whereby the water pressure is evenly distributed and the water flows uniformly upwardly through the zeolite bed.

A strainer is provided at the outlet end of the pipe 24 for separating the zeolitic mineral and other foreign substance from the water before it passes from the tank. In Fig. 14 a preferred form of strainer is shown as comprising a pipe 27 having numerous small orifices 31 therein. The pipe is connected to the end of the outlet pipe 24 and extends transversely across the upper end of the tank 20. An aperture 30, formed in the wall of the softener tank in alignment with the axis of the pipe 27, receives an annular boss 29 which in turn receives a closure plug 28. The plug 28 carries a projecting tubular section 27ª which, when the parts are assembled, extends inwardly of the tank into substantial abutment with the end of the pipe 27. The section 27ª carries a tubular screen 32 of relatively fine mesh arranged to fit snugly about the strainer pipe 27. In consequence of this construction, the strainer may be cleaned by merely unscrewing the plug 28 to remove the screen 32 from the tank.

One of the features of the present invention is the provision of a single means for controlling the operation of the softening system. In accomplishing this, a valve generally designated 33 (Figs. 1, 2, and 3) is provided which has a single operating member or handle 34. The valve has two operative positions, one of which controls the flow of water from a source of supply through the softening tank to the distribution system, and, in the other position, directs a flow of brine solution through the softening tank to a drain. The valve also directs a flow of raw water to replenish the supply of solution in the brine tank after a regenerating cycle has been completed, and further directs a flow of water to the distribution or service system during the regenerating cycle.

Referring to Figs. 5 to 13 inclusive, a preferred construction of the valve is illustrated as comprising a hollow, substantially elongated valve casing 35 having on the lower portion thereof a set of three pipe receiving nipples 36, 37, and 38 communicating respectively with the three ports 39, 40, and 41 positioned in substantially the same transverse plane in the inner wall of the hollow casing. A second series of three nipples 42, 43, and 44 are provided near the upper portion of the valve casing immediately above the lower set of nipples, and these upper nipples communicate with the second series of ports 45, 46, and 47, similarly formed, in the inner wall of the casing.

Interiorly, the hollow casing is finished to receive rotatably therein a valve member 48 which is preferably tapered in the customary manner. Suitable packing glands, generally indicated at 49 and 50, are provided on the upper and lower ends of the valve casing to prevent leakage. The valve member 48 extends upwardly through the packing gland 49 to receive thereon the operating member 34.

The fluid connections to the various nipples of the valve are shown in Figs. 1, 2, 3, 4, and 6. Thus, 51 indicates a pipe line connected to a source of supply of raw water (not shown), which pipe line is connected to the upper nipple 44. The lower nipple 38, on the same side of the valve, receives the pipe line 52 leading to the service system (not shown). On the opposite side of the valve the pipe 23, which conducts water to the lower portion of the softener tank 20, is connected to the upper nipple 42, while the lower nipple 36 receives a drainage pipe 53 leading to a suitable drain (not shown).

The third upper nipple 43 is connected to a pipe line 54 which leads to the brine tank 22, and the corresponding lower nipple 37 connects with the pipe line 24 leading from the upper portion of the softener tank. In consequence of these connections, it will be seen that the flow of water during any operation of the softening system is to or from the valve unit.

The valve member 48 is arranged to be set in any one of three positions, which may be designated for convenience as the softening position, the regenerating position, and the cut-off position, and is provided with a number of passageways therethrough which may be selectively brought into registry with various of the upper and lower ports in the valve casing to direct the flow of liquid therethrough.

Assuming that the valve is set to operate at the softening position, Figs. 7 and 9 illustrate respectively the valve passageways for the upper and lower ports. Preferably, the ports 45 and 47 in the upper portion of the valve, and the ports 39 and 41 in the lower portion of the valve are substantially diametrically opposed, and the remaining ports 46 and 40 are positioned substantially midway between said diametrical ports. The upper portion of the valve member 48 is provided with a passageway 55 extending diametrically therethrough and arranged to communicate, in this position of the valve, with the ports 45 and 47.

The lower portion of the valve is provided with an arcuate passageway 56 formed substantially in one quadrant of the valve member 48 and arranged, in this position of the valve, to connect the ports 40 and 41. Thus, when the valve is set in its softening position, water from the raw water supply pipe 51 flows into the valve through the port 47 and passes through the passageway 55, the port 45, which in turn is connected to the pipe 23 leading to the lower portion of the softening tank. After the water flows through the softening tank it issues therefrom through the pipe 24 which communicates with the port 40, subsequently passing through the valve passageway 56, and the port 41 into the pipe line 52 leading to service.

Now considering that the valve member has been moved through one quadrant into its regenerating position, (as illustrated in Figs. 11, 12, and 13) the passageway 55, in the upper portion of the valve, moves into registry with the port 46 which is connected by the pipe 54 to the brine tank. A second passageway 57, extending diametrically across the upper portion of the valve member 48, intersects the passageway 55, and the point of intersection, as shown in Fig. 12, is preferably enlarged to form an internal chamber 58.

The part of the passageway 57, which communicates with the hard water inlet port 47, carries therein a nipple 59 having a restricted orifice 60, and the opposed portion of the passageway 57, which communicates with the outlet port 45 to the softener tank, receives a sleeve member 61 having an enlarged outwardly tapering bore 62. The nipple 59 and the sleeve 61 are so positioned that the orifice 60 and the bore 62 are substantially adjacent and are in alignment with each other to provide, in effect, a venturi within the chamber 58. In consequence of this arrangement, when the valve is in the regenerating position, hard water from the supply pipe 51, in passing through the venturi to discharge into the pipe 23 leading to the softener tank, sets up a suction within the chamber 58 which draws a certain amount of brine from the brine tank 22 through the connecting pipe 54 and the port 46 to provide a brine solution flowing to the softening tank for regenerating purposes.

Fig. 13 shows the lower portion of the valve, also in the regenerating position. The passageway 56 now connects the port 40, communicating by way of the pipe 24 with the upper portion of the softener tank, with the port 39 which leads, through the pipe 53, to the drain. Therefore, the exhausted brine solution, after it has passed through the softening tank to regenerate the zeolitic mineral therein, is discharged from the system.

In this position of the valve, a vertically extending by-pass 63 in the valve member 48 is provided to connect the hard water inlet port 47 with the outlet port to service 41, whereby during the regenerating cycle a certain amount of fresh hard water is by-passed through the valve into the pipe line 52 leading to service, thus providing an uninterrupted supply of water in the service system during the regenerating cycle.

The cut-off position of the valve, in this embodiment, is substantially intermediate the softening and regenerating positions thereof, wherein, as shown in Figs. 8 and 10, certain portions of the body of the valve member are positioned in front of and close each of the upper and lower ports 45, 46, 47, and 39, 40 and 41.

For the convenience of the operator, a bracket may be mounted externally on the valve casing 64 (Figs. 5 and 6) to underlie an appropriate pointer 65 carried by the valve operating member 34, which bracket presents a suitable legend for each operative position of the valve; as for example, "Salt," "Off," and "Soft." It will be seen, therefore, that it is only necessary for the operator to move the valve operating member 34 from one indicated position to another in order to direct the flow of water through the system for either of the cycles of operation.

As has been previously mentioned, during the regenerating cycle, brine is withdrawn from the brine tank by means of the Venturi action within the valve. In order that the brine solution in the tank may be of constant strength, which preferably is a completely saturated solution, the brine tank is charged with a relatively large quantity of salt crystals, which are covered with water maintained at a substantially constant level. Preferably, the brine solution is withdrawn from a point near the bottom of the brine tank and for this purpose the pipe line 54, connecting the brine tank and the valve 33, extends inwardly of the brine tank to a point substantially near the center thereof and is there connected to a depending pipe 66, the lower open end of which is positioned adjacent the bottom of the brine tank. Preferably, a suitable strainer 66ª prevents foreign matter from passing from the brine tank into the system.

During the process of regenerating the zeolitic mineral, it is known that the quantity of brine solution required to return the zeolite to its original condition is directly proportional to the amount of zeolite in the softening tank. With this in view, the present invention provides a simple means for measuring a predetermined quantity of brine which may be withdrawn from the tank during regenerating cycle, and which positively stops further flow of the brine after said predetermined quantity has been withdrawn from the brine tank.

In this embodiment, see Figs. 1, 3, 16 and 17, this means is in the form of a valve 67 interposed in the pipe 66 and arranged to be controlled by a float means 68. The valve comprises an elongated tubular valve casing 69 having pipe receiving nipples 70 at the opposite ends thereof. For convenience, the casing may be formed in two sections which are screw threaded together, as at 71, in order to facilitate assembly of the valve. Substantially centrally, the valve casing is provided with a transverse partition 72 having a central opening therein through which a valve stem 73 extends. Near the opposite ends of the valve casing are transverse guide members 74 which are centrally bored to receive and guide the opposite ends of the valve stem 73.

A pair of valve members 75, 75ª, in the form of flat disks of leather or the like, and of such size as to close the central opening in the partition 72, are carried by the valve stem on opposite sides of the partition 72 so that longitudinal movement of the valve stem 73 to an extreme position in either direction positions one or the other of the valve members in closing abutment against the central opening in the partition. If desired, the margin about the central opening in the partition may be raised and finished to provide a smooth valve seat 76, 76ª on each side of the partition. At a point below the lower one of the valve members 75, the valve stem is somewhat enlarged as at 81, which enlarged portion is transversely slotted as at 82.

The valve casing 69 is formed with a laterally extending tubular boss 77 (Fig. 16) through which a shaft 78 extends into the interior of the valve, a suitable packing gland 79 being provided to prevent leakage therethrough. The shaft 78 forms part of a crank having an inner short arm 80 (Fig. 17) and the relative disposition of parts is such that the end of the arm 80 may engage the slot 82 in the valve stem 73. The external end of the shaft 78 carries an elongated crank arm 83 extending in the opposite direction from the arm 80 on the other end of the shaft and carrying the float member 68. Thus, as the float member 68 follows the variation of liquid level in the brine tank, the arm 80 also moves up or down within the valve casing.

In considering the operation of the valve 67, it will be observed that the slot 82, in the valve stem, is of such width as to provide a lost motion connection between the valve stem and the arm 80, thus permitting a limited independent movement of the valve stem relative to the arm. Starting with the assumption that a regenerating cycle has just been completed, and that the normal liquid level in the brine tank has been lowered by the withdrawal of brine therefrom, the float, in following the level of the liquid, has swung the arm 80 upwardly to bring the lower one 75ª of the valve members against the lower valve seat 76ª to prevent further flow of brine from the brine tank.

Movement of the operating valve handle 34, from the salt to the soft position, moves the valve member 48 of the main control valve into the position shown in Fig. 7, in which the hard water from the supply main passes directly through the valve. During the passage of the water therethrough a certain amount is deflected or by-passed through the sleeve section 61 of the venturi, thence through the port 46 and pipe 54 leading to the brine tank. The pressure of the water thus deflected is sufficient to unseat the valve member 75ª whereby water is by-passed into the brine tank through the valve to replenish the supply of brine which has been previously withdrawn therefrom during the regenerating cycle.

The initial opening movement of the valve member 75ª is, of course, limited by the engagement of the upper side of the slot 82 with the arm 80, which engagement is yieldingly maintained as the float 68 rises in following the liquid level in the brine tank. Thus, the tendency of the valve to close, under the effect of the incoming water, is retarded until the float reaches the predetermined high level. As soon as the valve has closed, the water pressure in the system maintains the valve member 75 in abutment with the valve seat 76, and further by-passing of water into the brine tank is prevented.

When the control valve is once more moved into the regenerating position, the water pressure on the upper valve member 75 is immediately released, and in its stead, the venturi in the main valve creates a suction of sufficient strength to unseat the upper valve member 75 and permit brine to flow from the brine tank. The engagement of the float arm 80 and the slot 82 operates to retard a too rapid seating of the valve member 75ª on the seat 76ª in precisely the same manner as in the reverse operation, except that the arm 80 is in engagement with the lower side of the slot 82 during this movement of the valve member.

It will be apparent, therefore, that the amount of brine which may be withdrawn from the tank during any regenerating cycle may be accurately determined by calculating the volume of the brine solution between the upper and lower levels designated by the float. Consequently, by predetermining the amount of solution necessary to complete a regenerative cycle, and then by determining the proportionate length of the float arm 83 to the valve operating arm 80, the valve may be accurately adjusted to permit only a required amount of liquid to be withdrawn from the brine tank. Obviously, only a similar amount of water may enter the tank through the valve during the initial portion of the softening cycle.

Briefly recapitulating the operation of the entire softening system, with reference to the diagrammatic illustration Fig. 4 and starting with the completion of a regenerating cycle, the operator moves the valve member 34 from the regenerating position to the softening position thereof. Hard water entering the valve 33 is discharged into the bottom of the softening tank through the distributing coil 25, and flows uniformly upwardly through the water softening bed of zeolites. The softened water is then strained and re-enters the valve to be discharged into the service system. At the same time, a certain portion of the hard water entering the valve is directed into the brine tank until the solution therein has reached its normal level, when the valve 67 closes to prevent further flow of water thereinto.

No further attention to the softening system is necessary until the zeolitic mineral has become exhausted, and regeneration thereof becomes necessary. The operator thereupon moves the valve operating handle to the regenerating position. The hard water continues to flow into the softening tank but now passes through the venturi, thereby opening the valve 67 and withdrawing brine solution from the brine tank. Inasmuch as the strength of the brine solution used in regenerating zeolite is an important factor in attaining the highest efficiency of regeneration, the Venturi tube is so constructed that the amount of brine solution drawn into and mixed with the hard water stream is proportional to the amount of water in the hard water stream so as to produce the desired strength of brine solution. Moreover the size of the passageways through the venturi are predetermined so that the velocity of flow to the softening tank is maintained at the speed most efficient for regenerating purposes.

The diluted brine solution from the valve flows through and revives the exhausted zeolite, and returns to the main control valve which directs the flow thereof to drainage. The regenerating cycle continues in this manner until the predetermined amount of brine solution has been withdrawn from the brine tank, as determined by the shutting-off of the brine flow by the brine control valve 67, after which, of course, only hard water is delivered to the softening tank. Thus, without attention on the part of the operator, a predetermined amount of brine solution passes through the zeolite bed and is then immediately supplanted by a flow of fresh water which washes the zeolite bed to remove every trace of the brine solution remaining therein. As soon as all traces of the brine solution have been removed therefrom, as may be determined by making the usual tests, the regenerating cycle is complete and the valve may be once more returned to its softening position. During the entire regenerating cycle the by-pass 63 in the valve has diverted a flow of hard water from the supply main to the service system so that the service system is not disconnected during the regenerating cycle.

We claim as our invention:

1. A water softening apparatus comprising, in combination, a softening tank having a bed of zeolites therein, a source of brine solution, a valve having a raw water inlet connected with a source of raw water, said valve also having a soft water outlet connected to service, a raw water outlet connected to the softening tank, a soft water inlet connected with the softening tank, a brine solution inlet connected to the source of brine solution and communicating with said raw water outlet, and a waste outlet to drainage, and means controlling the flow of fluid through said inlets and outlets.

2. A water softening apparatus comprising, in combination, a softening tank having a bed of zeolites therein, a source of supply of brine solution, a valve having a raw water inlet connected with a source of raw water supply, said valve also having a soft water outlet connected to service, a raw water outlet connected to the softening tank, a brine solution inlet connected to the source of brine solution, and a waste outlet to drainage, and a valve member in said valve having in one position thereof passageways connecting said raw water inlet and outlet, and said soft water inlet and outlet, and in another position thereof having passageways connecting said raw water inlet and outlet, said brine solution inlet and the raw water flow, said soft water inlet and said outlet to waste, and an injector carried by said valve member for movement into the path of said raw water flow adjacent said brine solution inlet for injecting brine solution into the raw water flow through said brine solution inlet.

3. A water softening apparatus comprising, in combination, a softening tank having a bed of zeolites therein, a source of supply of brine solution, a valve having a raw water inlet connected with a source of raw water supply, said valve also having a soft water outlet connected to service, a raw water outlet connected to the bottom of the softening tank, a soft water inlet connected with the top of the softening tank, a brine solution inlet connected to the source of brine solution, and a waste outlet to drainage, and a valve member in said valve having in one position thereof passageways connecting said raw water inlet and outlet, and said soft water inlet and outlet, and in another position thereof having other passageways connecting said raw water inlet and outlet, and said brine solution inlet and raw water outlet, and said soft water inlet and waste outlet, said valve member further having a by-pass therein connecting said raw water inlet and said soft water outlet.

4. In a water softening apparatus, the combination of a softening tank having a bed of zeolites therein, a source of supply of brine solution, and a valve for controlling the flow of water through said apparatus, said valve having a raw water inlet, a raw water outlet, a soft water inlet, a soft water outlet, a brine solution inlet and a waste outlet, a valve member in said valve having a plurality of passageways therein arranged when the valve member is in one position separately to connect said raw water inlet and outlet and said soft water inlet and outlet, and in another position thereof to connect said raw water inlet and outlet, said brine solution inlet and said raw water outlet, and said soft water inlet and waste outlet, and fluid connections for supplying raw water to said valve, for conveying softened water to service, for connecting said valve with said softening tank, and for connecting said valve with said source of brine solution.

5. In a water softening apparatus, the combination of a brine tank, a pipe connection leading from said brine tank, and a float valve interposed in said pipe connection for controlling the flow of fluid in either direction therethrough, said valve comprising a float actuated arm movable in accordance with the variations of liquid level in said tank, and a pair of valve members connected to said float actuated arm and arranged to close said valve as said float actuated arm reaches a predetermined upper or lower limit.

6. In a water softening apparatus, the combination of a brine tank, a pipe connection leading from said brine tank, and a float valve interposed in said pipe connection for controlling the flow of fluid in either direction therethrough, said valve comprising a casing connected at opposite ends to said pipe connection, an internal wall in said casing having a valve port therein, a pair of valve members positioned one on either side of said port, means for moving said valve members to bring one or the other thereof into closing engagement with said port, and a float actuated arm operatively connected to said means.

7. A water softening apparatus comprising, in combination, a softening tank having a bed of zeolites therein, a source of supply of brine solution, a valve having a raw water inlet connected with a source of raw water supply, said valve also having a soft water outlet connected to service, a raw water outlet connected to the softening tank, a brine solution inlet connected to the source of brine solution, and a waste outlet to drainage, and a valve member in said valve having in one position thereof passageways connecting said raw water inlet and outlet, and said soft water inlet and outlet, and in another position thereof having passageways connecting said raw water inlet and outlet, said brine solution inlet and the raw water flow, said soft water inlet and said outlet to waste, and a sectional injector associated with said valve and having at least one section mounted on said valve member for movement thereby into the path of raw water flow adjacent to the brine solution inlet for inducting brine solution into the raw water flow through said brine solution inlet.

In testimony whereof we have hereunto affixed our signatures.

ERNEST T. WAHLBOM.
LEROY C. LIND.
PHILIP C. WAHLBOM.